United States Patent [19]
Baxter

[11] 4,093,266
[45] June 6, 1978

[54] CARGO CARRIER

[75] Inventor: Bobby G. Baxter, Warrenton, Mo.

[73] Assignee: The Binkley Company, Warrenton, Mo.

[21] Appl. No.: 804,928

[22] Filed: Jun. 9, 1977

Related U.S. Application Data

[62] Division of Ser. No. 705,585, Jul. 15, 1976.

[51] Int. Cl. .................................................. B60d 1/14
[52] U.S. Cl. ............................ 280/491 R; 280/43.11;
   214/505
[58] Field of Search .............. 280/491, 414 R, 414 A,
   280/43.11; 214/505, 506

[56] References Cited
   U.S. PATENT DOCUMENTS 3,497,232  2/1970  Richey ..................... 280/43.11
3,738,684  6/1973  Luck ......................... 280/491 R Primary Examiner—Robert R. Song
Attorney, Agent, or Firm—Rogers, Eilers & Howell

[57] ABSTRACT

A cargo carrier includes a trailer bed having a rear end raising and lowering structure including a pivotal tail section, said bed being slidingly supported by a carriage. The tail section is operable to pivot in response to fore and aft sliding movement of the bed on the carriage to lower and raise the rear end of the bed relative to the ground. In a modification, a second carriage is pivotally attached to the rear of the first carriage by a connecting frame, and slidingly supports the bed. The carrier also has a front end raising and lowering structure having members attached to the front end of the bed and adapted for attachment to a towing vehicle for lowering and raising the front end of the bed in response to fore and aft movement of the towing vehicle.

9 Claims, 18 Drawing Figures

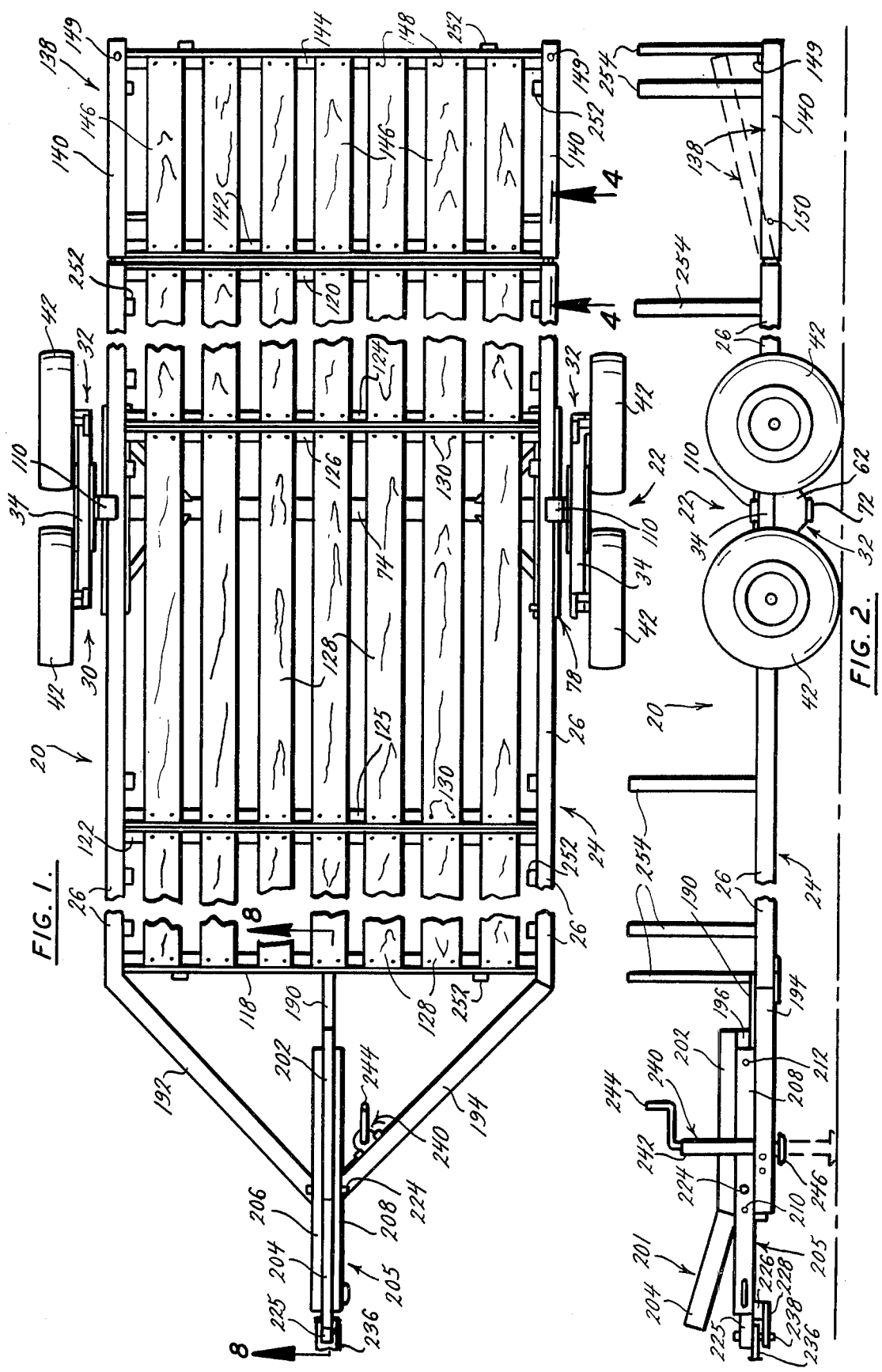

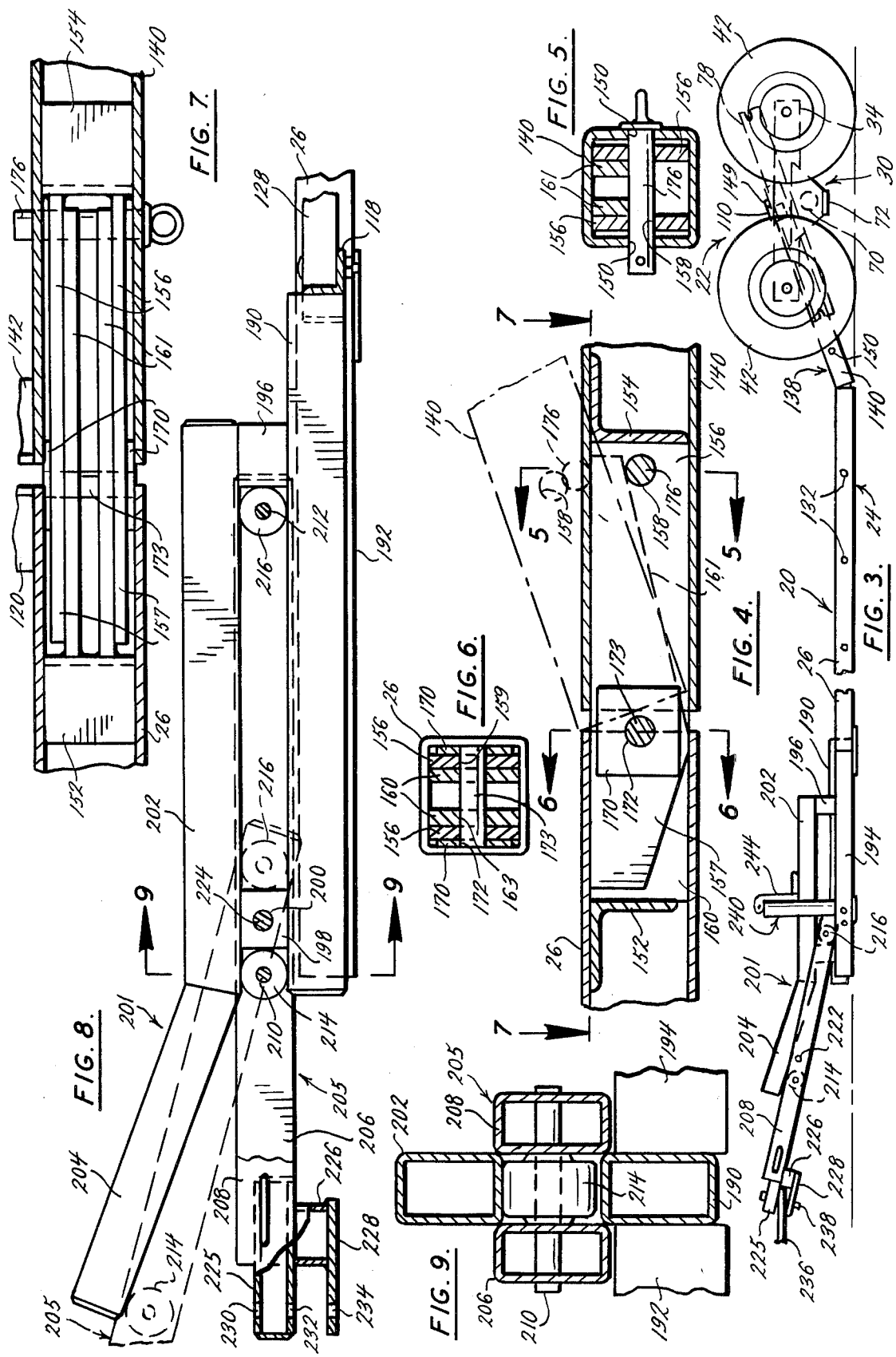

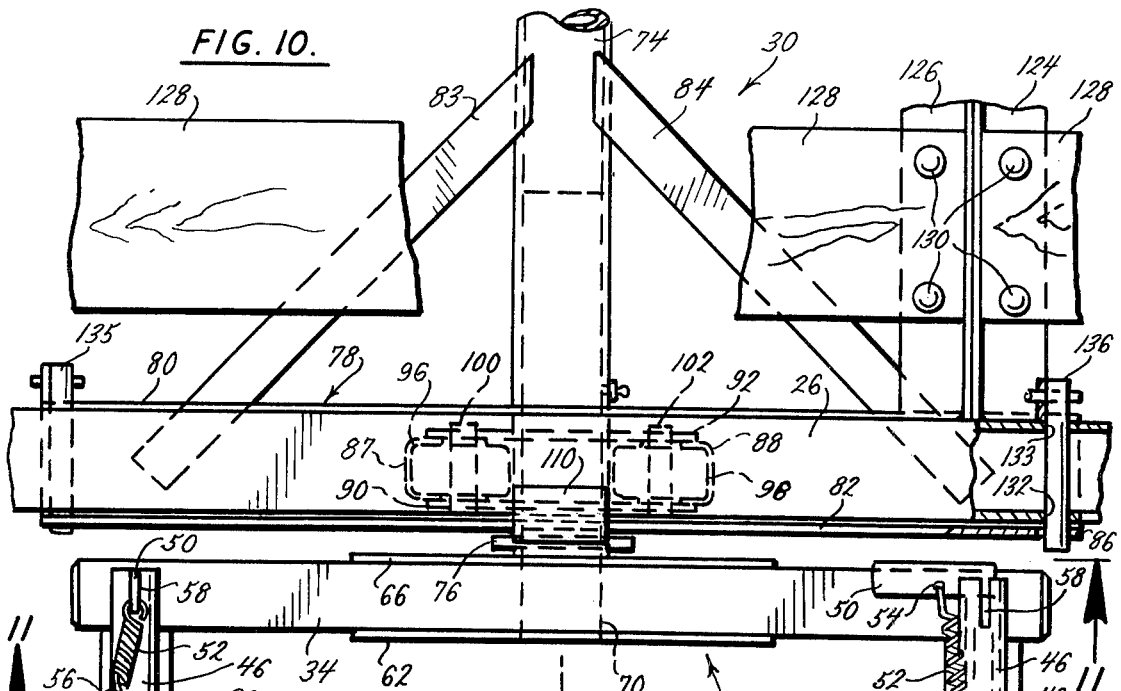
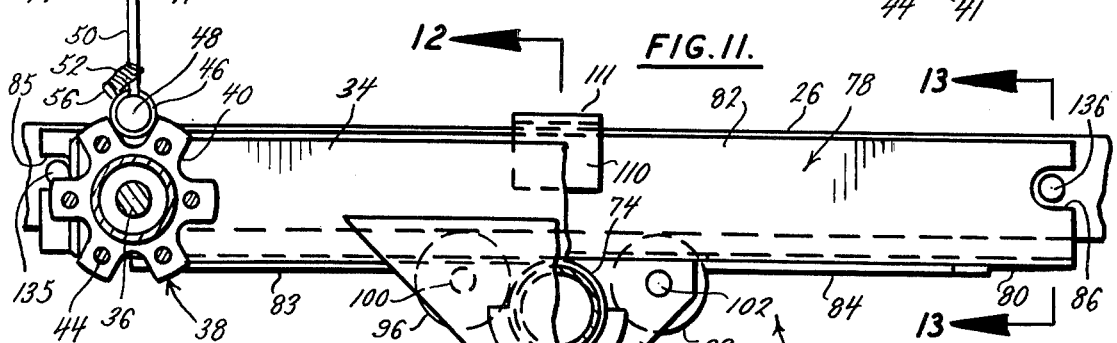
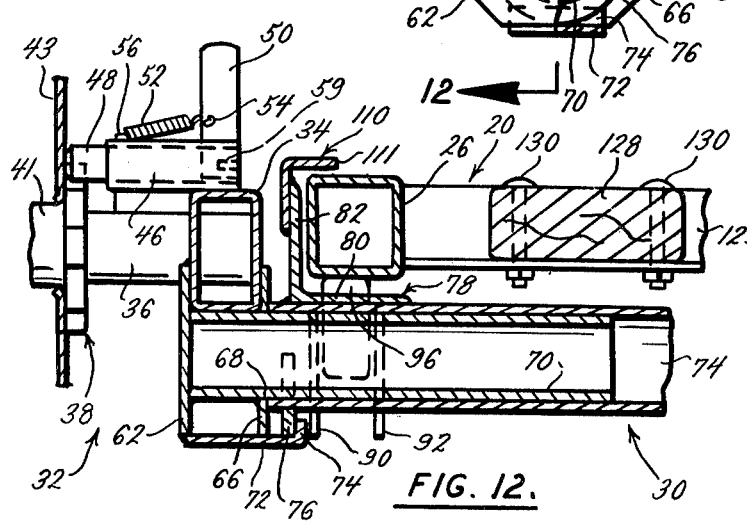
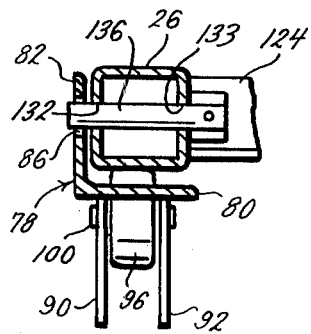

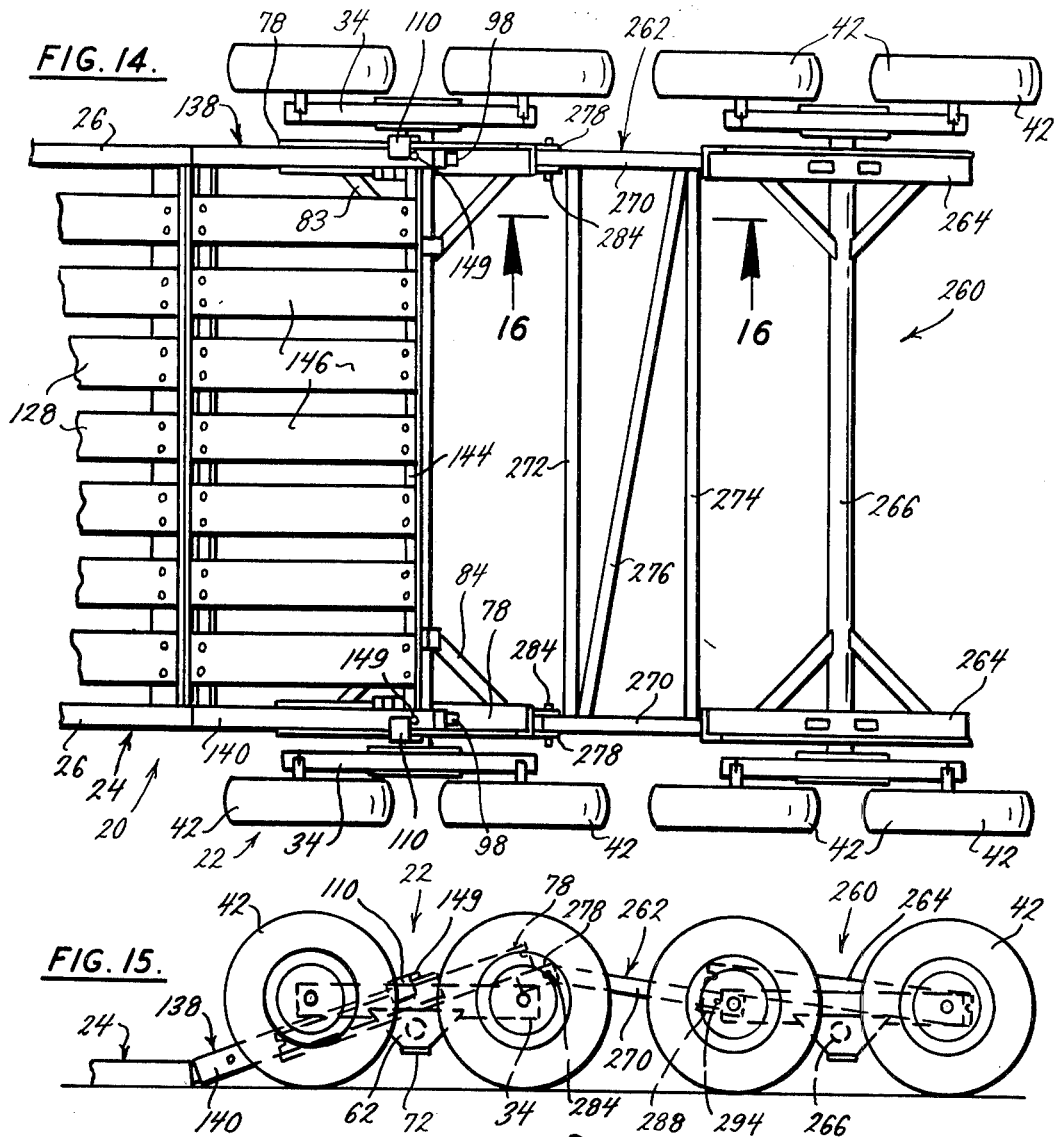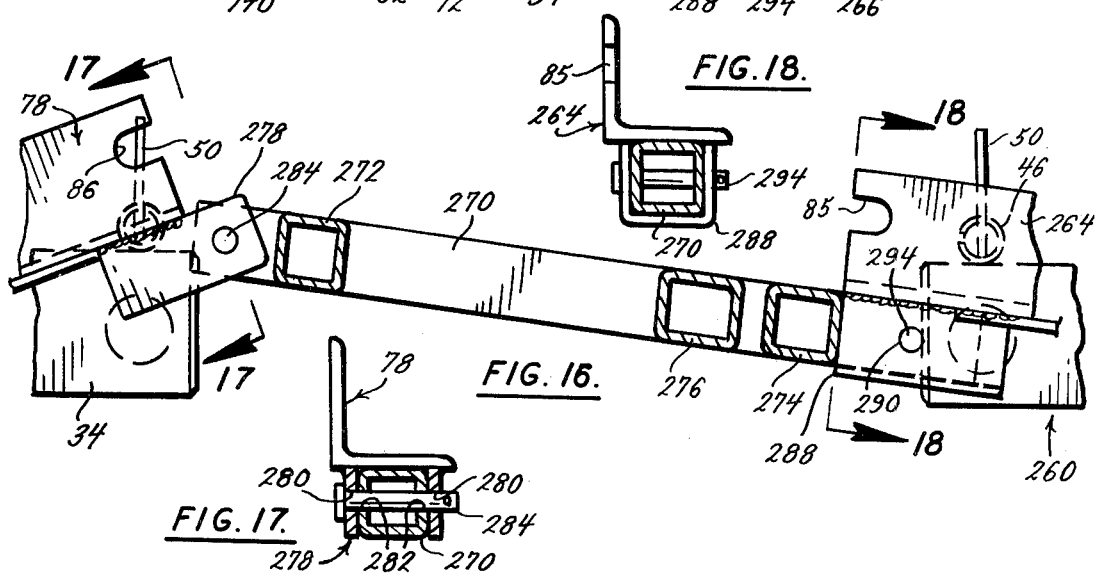

CARGO CARRIER

This is a division, of application Ser. No. 705,585 filed July 15, 1976.

FIELD OF THE INVENTION

This invention relates to carriers used to transport or to move cargo and is particularly concerned with such carriers having a supported loading bed that can be lowered onto the ground for purposes of loading and unloading cargo, and can be raised above the ground for purposes of moving the cargo from one position to another. The invention can be used with movable beds such as those supported by wheels so that cargo can be loaded upon the bed and transported as by a towing vehicle to another location for unloading.

DESCRIPTION OF THE PRIOR ART

Means to raise and lower both the rear and front ends of carrier beds are known in the prior art. For example in U.S. Pat. No. 3,179,271 of J. C. Donahue, dated Apr. 20, 1965 a disclosure is made of a carrier for farm implements and the like having a bed which is slidingly supported on a wheeled tiltable carriage. When the carriage is locked into position, the bed can be pulled forward by a towing vehicle which supports the front end of the bed, so that the bed slides upon angle bar slides connected to the carriage axle. When the rear end of the bed passes the front of the axle the slides tilt downward engaging the ground so that the rear end of the bed can slide to the ground. The bed can be elevated from the position by backing the towing vehicle so that the bed is moved backwards to slide up the slides to an elevated position.

In U.S. Pat. No. 3,497,232 granted to C. B. Richey dated Feb. 24, 1970 there is a disclosure of a hitch mechanism for lowering the front end of a bed. In Richey a hitch member is secured to the bed and slants from the front end of the bed upwardly towards the rear end of the bed. A sliding trolley which is secured to a towing vehicle engages the rearwardly slanted member in a manner to lower the front end of the bed when the trolley slides rearwardly along the slanted rail, and to raise the front end of the bed when the trolley slides forwardly along the slanted rail. When the front end is lowered to the ground in such fashion, the rear end of the towing vehicle is positioned at a distance closer to the front end of the carrier than it was when the front end of the carrier was supported in an elevated position. This rearward movement of the vehicle relative to the carrier to lower the carrier can block access to the front end of the carrier bed and to the connecting arrangement. Also, the front end of the carrier may extend beneath the towing vehicle so as to interfere with parts located on the underside of the towing vehicle. Because of the nature of some towing vehicles use of such a rearwardly and upwardly slanting member as in Richey is precluded.

In the Richey device the means for raising and lowering the rear end of the bed is similar to that disclosed in Donahue.

To raise both ends of the bed in Richey it is necessary to first drive the towing vehicle forward to cause the sliding trolley member to move along the slanted member to lift the front end of the bed. A plunger acts to lock the trolley to the slanted member after the front end is so raised. However, if this plunger does not act to lock the trolley, it is necessary to manually lock it before raising the rear end of the bed. This is necessary because the subsequent rearward movement of the bed that is necessary to raise the rear end of the bed would lower the front end of the bed if the trolley is not locked. After the driver of the vehicle locks the trolley he can then reverse directions and move the towing vehicle backwards to move the bed so that it slides up the carriage slides and is returned to a horizontal position.

SUMMARY OF THE INVENTION

The present invention includes a loading bed which has its rear end supported by a carriage having a transverse axle and slide members extending fore and aft of the axle which slidingly engage the bed to support it. The present invention overcomes difficulties present in the prior art by providing slide supports which need not extend to the ground or pavement when the end of the bed is pulled forward of the carriage axle so as to cause the slide to tilt downwardly towards the front of the carrier. Instead the carriage slides can be made shorter, with increased stability, such that they will not engage the ground but will provide sliding support for the bed to properly guide it during the lowering process. This is accomplished by a pivotal tail section secured to the rear end of the bed that is in sliding engagement with the carriage slide when the bed is lowered. This permits further forward movement of the bed relative to the carriage while the tail section is retained by the slides in such a manner that the bed movement is still controlled by the slides. Stops are provided at the end of the tail section to engage the carriage slide to prevent the tail from becoming disengaged from the carriage. The presence of the flip tail section gives the carrier greater versatility in handling awkward loads as well.

The present invention also has means to lower the front end of the carrier which overcomes prior art difficulties. At the front end of the carrier a guide member secured to the carrier slants upwardly towards the front end of the carrier. A draft slide assembly has a roller wheel that engages the underside of the slanted member so that forward movement of the draft bar by a towing vehicle will lower the bed. This permits the front end of the carrier to be moved away from the rear end of the towing vehicle when the bed is lowered so that the front of the carrier is not underneath the towing vehicle. Greater access to the front end of the carrier is provided than in prior art devices, and the possibility of interference of the front part of the carrier with the rear underside of the towing vehicle is also eliminated.

To raise the front end of the bed from a lowered position it is only necessary to back the rear end of the vehicle towards the front end of the carrier so that the roller of the draft bar rolls from the upper end of the slanted member to the lower end of the slanted member to raise the bed. After the front end is so elevated it is not necessary to lock the front end draft bar to raise the rear end as in prior art devices. The driver can simply continue the rearward movement of the vehicle which pushes the bed rearward. The bed slides upward upon the carriage slides, and when the rear end of the bed passes the carriage axle, the bed is returned to a horizontal position. After the bed is returned to the elevated horizontal position, the draft bar and carriage can then be locked into position relative to the bed so that the cargo can be transported.

Thus, with this invention both the forward and rearward ends of the bed are lowered by movement of the towing vehicle in the forward direction, and both ends are raised by movement of the towing vehicle in the rearward direction, in each instance with the wheels of the carrier suitably locked.

In a modification of the invention a second carriage is pivotally attached to the first carriage so that extra support can be provided for heavy loads.

DESCRIPTION OF THE DRAWINGS

FIG. 1 is a top plan view, partly broken, showing the carrier;

FIG. 2 is a side plan view of the carrier, with the tail section of the carrier being shown in an elevated position in dashed lines, and with a front end jack shown in a lowered position in dashed lines;

FIG. 3 is a side plan view showing the front and rear ends of the carrier bed in a lowered position for loading;

FIG. 4 is a section taken on the line 4—4 of FIG. 1 showing the pivotal connection of the bed to the tail, with a portion of the tail being shown in an elevated position by dashed lines;

FIG. 5 is a section of the tail side rail taken on the line 5—5 of FIG. 4;

FIG. 6 is a section showing the pivotal engagement for the bed and the tail taken on the line 6—6 of FIG. 4;

FIG. 7 is a section showing the bed rail and tail rail engagement taken on the line 7—7 of FIG. 4;

FIG. 8 is a side section view of the front end lowering apparatus with some parts broken, taken on the line 8—8 of FIG. 1;

FIG. 9 is a section of the lowering apparatus for the front end of the carrier taken on the line 9—9 of FIG. 8;

FIG. 10 is a top view partly in section of the carriage portion shown at the lower side of FIG. 1, showing a side of the slide assembly and a portion of a carriage support;

FIG. 11 is a side plan view with the right side of the carriage support broken for purposes of clarity, taken on the line 11—11 of FIG. 10;

FIG. 12 is a section of the slide assembly and carriage support taken on the line 12—12 of FIG. 11;

FIG. 13 is a section showing a bed rail supported by a slide, taken on the line 13—13 of FIG. 11;

FIG. 14 is a top plan view showing a modification of the invention in a lowered position;

FIG. 15 is a side plan view of the modified invention showing the bed in the lowered position;

FIG. 16 is a section of the modified invention showing the linking frame in engagement with the front and rear carriage, taken on the line 16—16 of FIG. 14;

FIG. 17 is a section showing an engagement of the linking frame to the front carriage, taken on line 17—17 of FIG. 16;

FIG. 18 is a section showing the linking frame in engagement with the rear carriage, taken on the line 18—18 of FIG. 16.

DESCRIPTION OF THE PREFERRED EMBODIMENT

The carrier, generally indicated as 20 in the drawings, includes a carriage 22 and a bed 24. The bed 24 includes parallel longitudinal side rails 26 which are supported by the carriage 22 as seen in FIGS. 1 and 2. The carriage 22 comprises a carriage roller slide assembly 30 and a carriage support including assemblies 32 located at each end of the carriage assembly 30. The carriage support assemblies 32 are mirror images of one another and a description of the assembly 32 located at the bottom of FIG. 1 is sufficient. Also, it is to be appreciated that various members or components of the carrier of this invention to be described can be connected or received in any appropriate manner, such as by welding or the like, as well known to those skilled in the art.

As seen more particularly in FIGS. 10, 11 and 12 the carriage support assembly 32 includes a base tube 34. At each end of the tube 34 are wheel axles 36 which extend through a bore in the outside wall of tube 34, so that its end can be secured to the inside wall of tube 34, as shown in FIG. 12. The outside wall of tube 34 is secured to the exterior of axle 36 at the bore of the tube 34. Wheel spindles 38 are rotatably attached to the outer ends of the wheel axles 36 and have curved notches 40 adapted to receive a locking pin yet to be described. Hubs 41 extend from the exterior side of the spindle 38 and receive the ends of the wheel axles 36 in a well known manner to permit rotation of the hub 41 and spindle 38 about the axle 36. Wheels 42 have their rims 43 secured to the spindle 38 as by bolts 44, so that the wheels are likewise rotatable about the axles 36.

Attached to the top side of the carriage base tube 34 adjacent each of the wheel spindles 38 is a cylindrical lock pin retaining tube 46 which slidingly receives a carriage lock pin 48. To permit manual operation of the lock pin 48, lock handles 50 are secured to the interior ends of the lock pins 48 by being securely fitted in a slot in the interior end of the lock pins 48.

Means are provided to urge the lock pins 48 outward from the rail base 34 into engagement with the spindle 38. A coil spring 52 has one of its ends secured in a bore 54 in the handle 50 while its other end is secured at 56 to a hook located at the exterior end of the retaining tube 46. At the top of the interior end of the tube 46 is a longitudinal slot 58 which is adapted to slidingly receive the lock handle 50 when the handle is positioned perpendicular to base tube 34 as shown for the left side handle in FIGS. 10, 11 and 12. In this position the lock pin 48 extends into an aligned notch 40 of spindle 38. This locks the spindle and the wheel attached to the spindle into a non-rotatable position relative to base tube 34. On the front interior side of the retention tube 46 is another longitudinal slot 59 as shown in dashed lines in FIG. 12. The handle 50 is shown positioned in the slot 59 in the right side retention tube 46 of FIG. 10. The side slot 59 is not as deep as the top slot 58, so that when the handle 50 is inserted within slot 59, the lock pin 48 is positioned out of engagement with the wheel spindle 38 as shown on the right hand side of FIG. 10.

At the bottom of base rail 34 are secured two gusset plates for support of an axle support tube. On the exterior side of rail 34 a trapezoidal shaped support plate 62 has its upper end secured to the side of base tube 34. On the other side of base rail 34 a trapezoidal shaped plate 66, having a circular bore 68, has its upper end secured to base tube 34. An axle support tube 70 has one end secured to the inside of support plate 62, and extends inwardly through bore 68 at which point it can be secured to plate 66. At the bottom of the two support plates 62 and 66 is an L shaped interlock plate 72. The upturned end 74 of plate 72 is adapted to interact with an axle interlocking member to be described.

Although the present description shows a carriage having two wheels on each side of the carriage, obviously a carriage having only one wheel on each side could be provided with each wheel having a similar index plate locking arrangement as well as an axle support tube.

As shown specifically in FIGS. 10 to 13, the carriage roller assembly 30, which is pivotal about the carriage supports 32, includes an axle tube 74 which extends transversely underneath the bed 20 and at each end rotatably receives the axle support tubes 70 in telescopic fashion. As the ends of the assembly mirror each other, a description of one end is sufficient.

At the end of axle tube 74 is secured interlocking member 76 that has a semi-circular shape which interacts with interlock member 72 to lock the carriage support 32 to the axle tube 74 as well as to the carriage roller slide assembly 30. To mount the carriage support 32 to the axle, the support is inverted, the tube 70 inserted in the end of the tube 74, and the support then rotated to an upright position to engage the members 74 and 76. An angle bar 78 is mounted at approximately its center and perpendicular to the axle 74 with its horizontal flange 80 generally on top and at the end of the axle tube 74. Its outer vertical flange 82 extends upwardly from the axle tube 74, the angle bar defining a slide for the side rails 26 of the bed 24.

A front brace rod 83 is located at the front end of the slide assembly and has one end secured to the front underside of horizontal flange 80, and its other end secured to the top of the axle tube 74. A rear brace rod 84 is located at the other end of the slide assembly and has an end secured to the top side of the axle tube 74 and its other end likewise secured to the rear underside of horizontal flange 80. The ends of vertical flange 82 have curved notches 85 and 86 adapted to receive bed locking pins.

The horizontal flange member 80 of the slide 78 has rectangular openings 87 and 88 located fore and aft, respectively, of the axle tube 74, shown with dashed lines in FIG. 10. To support rollers to be described, parallel plates 90 and 92 are secured at their upper ends to horizontal angle flange 80 on either side of the slots 87 and 88.

A front roller 96 and a rear roller 98 are rotatably supported between the plates 90 and 92 by means of pins 100 and 102 extending through the rollers and appropriate bores in the plates, such that the rollers extend above the flange 80. The elevation of these rollers above flange 80 allows the rollers to act as roller bearings for sliding movement of bed rails 26.

At the top of the vertical flanges 82 of the slides is secured an L shaped rail guide and stop 110 having one end 111 extending horizontally so that it lies above bed side rail 26 when the bed is supported by the carriage, as shown in FIG. 12. Guide 110 prevents bed rail 26 from moving vertically in such fashion so as to be disengaged from the slide 78, and also stops movement of the bed by engaging a pin yet to be described.

The bed 24 has a front transverse plank support angle bar 118 having its ends secured to the interior sides of side rails 26. At the rear end of the bed is located a similar rod 120 having its horizontal flange pointed towards the horizontal flange of member 118.

A transverse angle member 122 is likewise secured to the side rails 26 and has its horizontal flange pointing towards member 118 so that member 122 can be paired with member 118 to support the ends of wooden planks. Likewise a similar transverse angle rod 124 has its horizontal flange pointed towards end transverse member 120 so that it can be paired with member 120 to support planks. There are also intermediate transverse angles 125 and 126 whose horizontal flanges likewise point to each other for purposes of plank support. A plurality of wooden planks 128 extend longitudinally across the bed 24 and have their ends attached to the horizontal flanges of their respective transverse support angles as by bolts 130.

To permit engagement of the carriage 22 to the bed 24, bores 132 and 133 are provided through the sides of bed side rails 26. The carriage 22 is positioned to support the bed 24 so that the notches 85 and 86 of slide 78 are aligned with bores 132 and 133 respectively. When this alignment occurs, lock pins 135 and 136 are inserted respectively into bores 132 and 133, and lock the carriage 22 to the bed 24, as shown in FIGS. 1, 2, 10 and 11. Of course such bores 132 and 133 can be provided at various points along the side rails 26, so that the carriage can be placed under the bed at different positions.

At the rear of the bed 24 is a tail section 138. The tail section has two parallel side rails 140 which are secured together by transverse front angle rod 142 and rear end transverse angle rod 144. A plurality of wooden planks 146 extend between the front and end transverse members and are secured to the horizontal flanges of those members as by bolts 148.

A metal stop pin 149 is secured to the upper rear end of each tail side rail 140, and is of such length as to engage the horizontal flange 111 of stop 110 when the tail is positioned on the slides 78 such as shown in FIG. 3. Bores 150 extend through the sides of tail side rails 140 to permit insertion of tail support pins to be described (FIGS. 2, 4 and 5).

Means are provided to connect the tail 138 to the bed 24 in a fashion which will allow the tail to flip upward to a slanted position such as that shown in dashed lines in FIGS. 2 and 3. Such means are provided in the same manner at both sides of the tail, therefore description of one side is sufficient and attention is directed to the structure shown in FIGS. 4 through 7.

In the rear of bed side rails 26 a short angle plate 152 has its horizontal flange secured to the top interior wall of the side rail 26. Likewise on the inside of the front of side rail 140 of tail 138 a small angle plate 154 has its horizontal flange secured to the top interior of the side rail 140. Rigidly secured to the vertical flange of interior angle plate 154 is a pair of identical slanted plates 156 which are spaced apart from each other as shown in FIGS. 5 and 7. As seen in FIG. 4, the rear portion of plate 156 is rectilinear in shape while its front section 157 is slanted as shown on its bottom side. The vertical front ends of plates 156 are spaced from the vertical flange of angle 152 so that movement of the slanted portion 157 within the bed side rail 26 is permitted. A bore 158 extends through the rear portion of the plates 156 and is in alignment with the bores 150 in the tail side rails 140. A second bore 159 is provided in the plates 156 at a point near the junction of the bed side rail and the tail side rail.

There is also a pair of plates 160 which are spaced between the two plates 156 and have their front ends secured to the vertical flange of interior angle 152. The front portions of plates 160 are rectilinear in shape while the rear portions 161 are slanted on their bottom sides as shown in dashed lines in FIG. 4. The rear ends of plates 160 terminate with the bottom edge of slanted section 161 positioned above the bores 150 in the side tail rail and bores 158 in plates 156. There is sufficient clearance between the end of the slanted section 161 and the vertical flange of angle plate 154 to permit movement of the slanted section 161 within the tail side rail 140. The plates 160 likewise have bores 163 extending through them at a point near the junction of the bed side rail and the tail side rail so as to be aligned with the bores 159 of plates 156.

A pair of square washer plates 170, which have bores 172 in their center, are positioned on the exterior side of the pair of plates 156. The bores 172 are in alignment with the bores of the plates 156 and 160 at the junction of the bed side rail and the tail side rail. A pivot lock pin 173 passes through the bores of the plates 156, 160 and 170 located at the junction of the bed and tail side rails, and is secured at its ends to the plates 70 while allowing pivotal movement of the plates 156 and 160 thereabout, thereby securing the tail section to the bed and also allowing pivotal movement of the tail relative to the bed.

As seen in FIG. 5 a lock pin 176 extends through the tail side rail bores 150 as well as through the bores 158 in plates 156. The pin 176 has its top portion in contact with the lower edge of slanted sections 161 of plates 160 and thereby prevents movement of the tail relative to the bed while the pin 176 is so lodged. To raise the tail 138 to the position shown by dashed lines in FIGS. 2 and 4, the pin 176 is removed and the tail moved upward until the bottom edge of the slanted sections 161 of plates 160 are flush with the bottom interior wall of tail side rail 140. During this tail movement, the bottom edge of slanted section 157 of plate 156 is pivoted until it is flush with the bottom interior wall of bed side rail 26. To lock the tail in the position, the pin 176 is inserted through the bores 150 in tail side rails 140 and the bores 158 in plates 156 so that the bottom edge of the pin 176 rests on the top edges of plates 160.

At the front end of the carrier 20 is means to raise and lower the front end of bed 24. A center guide rail 190 has its rear end secured to the vertical flange of front transverse angle 118 and extends perpendicularly and forwardly therefrom as shown in FIGS. 1 and 8. Frontal rails 192 and 194 slant inwardly from their connections to side rails 26 and connect to the front end of center member 190.

In order to provide connection and support for a guide member to be described, short tubular members 196 and 198 extend vertically from the rear top side of member 190 at its rear and front ends, respectively. The member 198 has a bore 200 extending through its sides as shown in FIG. 8.

A guide rail 201 has a rear horizontal portion 202 secured to the tops of support tubes 196 and 198, and a slanted portion 204 which extends forwardly and upwardly from the front of portion 202 as shown in FIG. 8.

To permit transmission of horizontal movement of a towing truck or other vehicle into vertical movement of the bed, a movable draft bar 205 is provided. Referring to FIGS. 1, 2, 3, 8 and 9, the bar 205 has parallel side tubes 206 and 208 held spaced apart by pins 210 and 212 located near the middle and near ends of the tubes, the pins extending through and being secured within suitable bores in the tubes. Rollers 214 and 216 are rotatably mounted about the pins 210 and 212, respectively, to ride along the rails 190 and 201.

Each side tube 206 and 208 also has bores extending through their sides at a point shortly to the rear of the front roller 214, one such bore being shown as 222 in FIG. 3. When the draft bar 205 is positioned so that the rear roller 216 abuts support 196, as shown in solid lines in FIG. 8, the bores 222 are aligned with the bore 200 of stop 198, so that a lock pin 224 can be inserted therethrough to lock the draft bar 205 to the front end of the bed 20. When the draft bar is in this locked position, its front roller 214 is positioned flush against the front side of stop 198, and between the top guide portion 202 and rail 190, as shown in FIGS. 8 and 9. The draft bar 205 and its rollers 214 and 216 are so aligned with guide members 190 and 201 that the draft bar 205 can, with the pin 224 removed, roll along these guides to positions such as shown by dashed lines in FIG. 8.

At the front end of the draft bar 205 is provided a hitching arrangement to permit the draft bar 205 to be secured to a trailer hitch. A short tubular section 225 is secured to the insides of the bars 206 and 208 and extends forwardly therefrom. A short tubular section 226 is secured at its top to the underside of hitch member 225, and at its bottom end to the top side of a lower hitch plate 228 to provide a support therefor. Upper hitch member 225 has aligned bores 230 and 232 extending through its top and bottom walls respectively which are aligned with a bore 234 in the plate 228. A hitch 236 (FIGS. 2 and 3) from a truck or other vehicle extends between hitching members 225 and 228, and a pin 238 passes through the aligned bores and through a bore in the hitch 236 to connect the carrier 20 to the vehicle for towing.

To provide an alternate method of raising and lowering the front end, a jack 240 has its vertical support tube 242 rigidly secured to the interior side of front member 194. The jack 240 is of the type well known in the art and can have a hand crank 244 which can be turned to move a post (not shown) within the support 242 to move a foot plate 246 upwardly and downwardly relative to support 242 to thereby support the front end of the carrier 20.

To help contain certain types of cargo, slat holders 252 are provided at various points along the side rails 26 of the bed and to the front transverse member 118 for receipt of vertical slats 254 as well known in the art. The tail section 138 likewise has such plank supports 252 secured to side rails 140 and end transverse member 144.

A modification of the invention provides greater carriage support for the bed so that the carrier can accommodate heavier loads. The modifications, depicted particularly in FIGS. 14 through 18 includes a second carriage 260 which is linked to the rear end of the first carriage 22 by a linking frame 262. The carriage 260 has components that are identical to those of the front carriage 22, except that the angle rod slides 264 which extend fore and aft of the axial tube 266 of the second carriage have no stop guides such as stop guides 110 secured to the top of slide 78 of the front carriage 22.

The connecting frame 262 comprises side members 270 which are connected to a front transverse member 272 and a rear transverse member 274. A diagonal transverse member 276 extends between opposite corners of the frame as shown in FIG. 14. The connecting frame 262 is connected in the same manner on both of its sides, therefore a description of the top side of FIG. 14 is sufficient.

To connect the two carriages together, a bracket 278 is connected to the underside of the horizontal flange 80 of the slide 78 of the front carriage. The bracket 278 has bores 280 in its side walls as shown in FIG. 17. The front end of frame side member 270 extends forward of the frontal frame transverse member 272 and has bores 282 extending through its side walls. The bores 280 of the bracket 278 are aligned with the bores 282 of side frame members 270 and secured together in pivotal fashion by a pin 284. In this position the front end of side member 270 is positioned rearwardly below the rear end of slide 78 so that the member 270 can pivot about pin 284 without striking the slide 78, as illustrated in FIG. 16.

To secure the rear end of the linking frame 262 to the rear carriage 260, a U shape bracket 288 is secured to the underside of slide 264 of the carriage 260 for receipt of the rear end of side member 270 as shown in FIGS. 16 and 18. The bracket 288 and member 270 have bores 290 through their vertical walls. The rear end of the side member 270 receives a pin 294 to lock the frame 262 to the rear carriage. The member 270 extends sufficiently within the brackets 288 and the fit therebetween is sufficiently snug such that there is no appreciable pivotal movement about the pin 294, and likewise linking frame 262 does not pivot relative to the slides 264 but is secured thereto.

In FIGS. 14 through 18 the bed 24 is shown in its lowered position with the tail section 138 inclined on the front carriage 22. When the carrier 20 is in the raised position for transportation, the tail section 138 is located over the rear carriage 260 such that the side members 140 of the tail rest on the slide angles 264. The second carriage 260 can be secured to the tail 138 in the same manner as previously discussed for securing the bed to the first carriage. Thus, bores (not shown) are provided in the sides of members 140 at positions so as to be aligned with the fore and aft slots 86 and 88 located at the ends of the vertical flanges of slides 64. Lock pins can then be inserted through the bores and slots to lock the tail to the carriage 260.

OPERATION

To operate the carrier 20, it will be assumed that the carrier is in the elevated position as shown in FIG. 2, that it is to be placed in the lowered position as shown in FIGS. 3 and 15 for loading farm implements or other cargo, and then again raised to the elevated position for hauling.

With the carrier in the elevated position for hauling, the bed 24 is supported on the carriage 22 with the slides 78 held generally horizontal by the weight of the bed as exerted on the slides 78 by the bed side rails 26. The bed is locked to the carriage by the pins 135 and 136 extending through the notches 85 and 86 in the slides 78 and through the correspondingly aligned bores in the bed side rails 26 so that movement of the bed produces corresponding movement of the carriage.

At the front of the carrier, the draft bar 205 is in its retracted position with both rollers 214 and 216 located between the members 190 and 202. The draft bar 205 is locked in this position by the extension of the pin 224 through the bores 222 in the draft bar and bores 200 in the stop 198.

When in the raised position for hauling, the wheels 42 are allowed to rotate by disengagement of the lock pins 48 from the spindles 38. The tail section 138 can be placed in either the lower, generally horizontal, position as shown by the solid lines of FIG. 2, or it can be placed in the raised or flipped position shown by the dashed lines of FIG. 2. In the lowered position, the tail section may be either left unlocked, or it may be locked by insertion of the pins 176 through the aligned bores 150, and 158, and with the pin extending just beneath the lower edges of the slanted portions 161 of the pivot plates 160, thus preventing the tail section from moving upward. With the tail section locked in the lower position, it will not tend to "bounce" as the carrier is pulled over rough terrain. The tail section can be locked in the raised position by lifting the tail section to the limits of its upward pivotal movement and inserting the pins 176 through the bores 150 and 158 and over the top of the slanted portions 161 of the plates 160 to take the position shown by dashed lines in FIG. 2. In this flipped up position, the carrier is better able to retain certain types of cargo such as round hay bales or other loose loads that might tend to slide off the back end of the carrier.

To place the carrier in the lowered position as shown in FIG. 3 for loading farm implements or other cargo, the pins 136 which lock the bed to the rear end of the carriage are removed at least far enough to disengage the slots 86, and the pin 224 which locks the draft bar 205 in the retracted position is removed sufficiently to disengage the stop 198. Also, since the carrier is lowered and raised by forward and reverse movement of a towing vehicle which produces horizontal movement of certain portions of the carrier relative to others, the wheels 42 must be locked against rotation. This is accomplished by engaging the lock pins 48 with the spindles 38. While it may not be necessary to lock all of the wheels, it is preferable to do so to better hold the carriage against movement. The tail lock pins 176 should either be removed so that the tail 138 is free to pivot upward, or the tail should be locked in its raised position.

To lower the bed, the tow vehicle is driven forward so as to pull the bed 24 forward with respect to the carriage 22. As the bed 24 is pulled forward, the bed side rails 26 slide along slides 78 and over rollers 98 and 196. During this movement of the bed side rails 26, the vertical flanges 82 of the slides 78 act to confine and guide the side rails 26 to prevent their transverse movement. The horizontal flange 111 of upper guide 110 also acts to prevent the bed rails 26 from moving upward away from the slides 78.

The bed 24 remains in a horizontal position as it is pulled forward with the front ends of the tail side rails 140 moving onto the slides 78. When the rear end of the bed 24 at the hinge joint passes beyond the vertical plane of the carriage axle tube 74, the weight of the bed upon the front portion of the slides 78 creates a positive counterclockwise bending movement about the axle (as viewed looking at FIG. 3) causing the slides 78 and the axle tube 74 to pivot so that the slides 78 are slanted downward towards the front of the carrier 20. At this point, the tail 138 pivots upward (if not already locked in that position) about the junction of the tail to the limits of such movement, and both the end of the bed and the pivoted tail section continue to slide down the slides 78.

The forward movement of the bed continues until the rear stop pins 149 at the end of the tail engage the top flanges 111 of stops 110. When this occurs the rear end of the bed 24 at the hinge joint rests very near the ground while the pivoted tail slants upward and rearward and is partially supported by the slides 78.

It will be noted that with the carrier in the lowered position, the tilted slides 78 need not extend forwardly to the ground. Instead, the forward end of the slides may be spaced several inches above the ground, as shown in FIG. 3, the tail section with its restricted upward pivotal movement, acting not only as the means to help retain the cargo on the bed when in its raised position, but also acting as a "movable ramp" lifting and lowering the rear end of the bed. Also, as seen in FIG. 3, the tail section forms an angle of inclination with the ground when the carrier is in the lowered position. This angle should be within a range such that rearward movement of the bed produces a smooth, rearward movement of the tail section along the slides 78 and an ultimate raising of the bed to the elevated position, and further such that the tail section is not excessively long. It can be seen that if this angle is too great, rearward movement of the bed will tend to create too great a rearward force component which would tend to cause the locked wheels to skid rather than causing the tail section to move smoothly up the slide. In this preferred embodiment this angle is approximately 15°.

While the slides 78 need not touch the ground, it is preferred that they be of sufficient length to act as a guide for the bed and tail section to maintain their proper alignment and prevent binding. It is one of the features of this invention that either the bed or the tail section is in engagement with the slides over substantially their entire length so that lateral alignment of the bed is maintained in both the raised and lowered positions of the carrier, and during operation of the carrier between these positions.

Continued forward movement of the towing vehicle also lowers the front end of the carrier. Such forward motion of the vehicle acts through hitch 236 to pull draft bar 205 forward relative to the bed 24. As the draft bar 205 is moved forward, the front roller 214 passes the front end of top guide portion 202 and lower guide member 190. As it continues to move forward the roller 214, by virtue of the weight of the bed 24, rolls along the underside of slanted guide portion 204. Simultaneously the rear roller 216 rolls forward on the top side of lower guide member 190 until it hits the stop 198. The presence of the lower guide member 190 thus offers resistance to the force exerted by the roller 216 so that the draft bar 205 does not pivot under the force exerted against it at the front roller 214. As the front roller 216 rolls upward underneath slanted guide portion 204, the front end of the bed 24 is lowered to the ground as shown in FIG. 3.

In this level position cargo of various kinds such as hay bales, equipment, or other heavy items can be loaded easily upon the bed 24. In this lowered position it is noted that the front part of the bed 24 is positioned farther from the vehicle hitch 236 than when the bed is in the elevated position. Thus the front end lowering means provides sufficient clearance away from the rear end of a towing vehicle so that there is greater access to the sides of the bed 24 for easier loading and unloading of equipment, and so that contact with the underside elements of a towing vehicle is avoided. It should be further noted that the lowering of both the front and rear ends of the bed 24 is accomplished with forward movement of the vehicle hitch 236, which contributes to smoothness and ease of operation.

After the bed 24 is loaded, the carrier 20 is returned to the elevated position of FIG. 2 by backing the vehicle so that the hitch 236 pushes the draft bar 205 towards the bed 24. With this motion the front roller 216 rolls towards the front end of the bed 24 along the underside of slanted guide portion 204, and in so doing lifts the front end upward until the roller 214 returns to a position adjacent the stop 198. The rear roller 216 simultaneously moves from its position adjacent the rear of stop 198 towards the support 196 where it comes to rest abutting the front end of support 196.

To raise the rear end of the bed it is only necessary to continue backing the vehicle such that the draft bar 205 pushes the bed 24 towards the carriage 22 and causes the tail side rails 140 to be pushed rearward and upward along the slides 78. As this pushing continues the bed rails 26 roll upward on the inclined slides 78 and continue upward along the inclined slides until the rear end of the bed at the hinge joint passes the vertical plane of the axle tube 74. At this point the weight of the bed causes the slides 78 to pivot clockwise as viewed in FIG. 3 so that they are again in a position approximately horizontal to the ground. Also at this point, if the tail section was unlocked, it falls to a horizontal position as shown by solid lines in FIG. 2. The bed is then pushed rearward until the front lock pins 135 engage notches 85. The elevation of both the front and rear of the bed is thus obtained with one smooth backward movement of the towing vehicle, and without the necessity of locking the front or rear during the process.

After engagement of the lock pins 135 with the notches 85, the vehicle is stopped and can again be placed in a configuration for hauling. This is accomplished by inserting the draft bar lock pin 224 and the rear carriage lock pins 136. The lock handles 50 are then moved out of slots 58 and into slots 59 so as to disengage the pins 48 from the notches 40 of the wheel spindles 38. The cargo can then be moved to another location and the bed can again be lowered in the manner previously disclosed to allow for easy unloading of the cargo.

Of course it is apparent that if, for any reason, it is desired to lower only the front end or the rear end of the carrier, this can be easily accomplished by removing the appropriate lock pins. Thus, if the front end is to be lowered but the rear to remain raised, the lock pin 224 is removed but the lock pins 136 left in place. If it is desired to lower the rear end but keep the front end raised, the lock pins 136 are removed and the pin 224 kept in place.

The modification shown in FIGS. 14 through 18 operates in such the same way. To lower the bed, the wheels of the carriages 22 and 260 are locked as previously disclosed, although it is sufficient to lock only the set of wheels for one of the carriages to enable the bed to be moved relative thereto. The tail section side rails 140 can also have bores similar to the bores 132 and 133 in the bed side rails for reception of locking pins for engagement with the notches at the ends of the vertical flanges of slides 264. To lower the bed 24 these pins are disengaged as are the pins 136.

After the carriage lock pins have been so disengaged, the vehicle can then be driven forward so as to act through hitch 236 to pull the bed forward relative to the carriages. The bed 24 and tail 138 are pulled forward with the front end of the tail section 138 entering upon the rear ends of the slide 78 while the rear end of the tail section 138 is still supported by the slides 264 of the rear carriage 260. The bed 24 and tail section 138 continue to remain in a horizontal position until the rear end of the bed 24 at the hinge joint passes in front of the axle tube 74 of the carriage 22 causing the carriage assembly 30 to pivot as previously described. With this pivoting, the rear end of the slides 78 in being lifted upward also lifts the front end of the frame side members 270, and thereby causes the front ends of the slides 264 of the rear carriage 260 to be pivoted upward slightly. Further forward movement of the bed lowers its rear end to the ground as depicted in FIG. 15. The front end of the bed 24 can be lowered in the manner previously described.

The bed 24 can be returned to its elevated position in much the same manner as with the single carriage embodiment. The front end is raised as heretofore described. Rearward movement of the bed acts to push the beds towards the carriages 22 and 260, so that the rear end of the bed slides up the slides 78 of the front carriage, and upon passing the axle 74, causes the carriage assembly 30 to pivot to a horizontal position thereby acting through frame side members 270 to return the rear carriage slides 264 to a horizontal position. During such movement the side rails 140 of the tail 138 are received upon the rear carriage slides 264. Rearward movement of the bed continues until the lock pins 135 engage the notches 85 in slides 78 as previously disclosed. After this occurs the vehicle is stopped and the carriages 22 and 260 and the draft bar 205 can be again locked to the bed and the wheels 42 unlocked for hauling.

Thus, there has been described a cargo carrier which by its unique design is operable between raised and lowered positions at both its front and rear ends by rearward and forward movement of the carrier bed, and which possesses the advantages heretofore described.

Various changes and modifications may be made in this invention, as will be readily apparent to those skilled in the art. Such changes and modifications are within the scope and teaching of this invention as defined by the claims appended hereto.

What is claimed is:

1. A cargo carrier operable between elevated and lowered positions, comprising a bed for supporting cargo, means for supporting the rearward end of said bed and means to raise and lower the front end of said bed relative to the ground, said front end raising and lowering means further comprising a member secured to the front end of said bed and inclined forwardly and upwardly relative thereto, and sliding means adapted to be attached to a towing vehicle and slidingly engaging said inclined member upon fore and aft movement of said sliding means relative to said inclined member, whereby forward movement of said sliding means along said inclined member toward the front end of said inclined member lowers the front end of said bed, and rearward movement of said sliding means along said inclined member toward the rear of said inclined member raises the front end of said bed.

2. The carrier of claim 1 further comprising roller means mounted to said sliding means and engaging the lower surface of said inclined member, whereby said roller means move fore and aft along the under side of said inclined member upon fore and aft movement respective to said sliding means.

3. The carrier of claim 2 wherein said sliding means further comprises spaced parallel rails, said roller means being rotatably mounted between said rails.

4. The carrier of claim 2 wherein said inclined member further comprises a rearward portion defining a channel in which at least one of said roller means of said sliding means travels, and having an inclined forward portion extending forwardly and upwardly from said rearward portion.

5. The carrier of claim 4 wherein said rearward portion further comprises parallel vertically spaced rails defining said channel.

6. The carrier of claim 5 further comprising stop means for limiting the forward and rearward travel of said sliding means relative to said bed section.

7. The carrier of claim 6 wherein said stop means further comprises members at each end of said rearward portion of said inclined member for mounting the rails of said rearward portion in vertically spaced relation.

8. The carrier of claim 4 wherein said roller means further comprises a plurality of rollers, at least one of said rollers being mounted for rotation about a generally transverse axis and riding in said channel, and another of said rollers mounted forwardly therefrom and riding along the under side of said inclined portion as said carrier is operated to raise and lower the front end of said bed section relative to the ground.

9. The carrier of claim 1 further comprising means for releasably locking said sliding means against fore and aft movement relative to said bed section.

* * * * *